Patented Aug. 14, 1945

2,382,286

UNITED STATES PATENT OFFICE 2,382,286

PURIFICATION OF IRISH MOSS

Norman Blihovde, Ridgewood, N. J., assignor to Jacques Wolf & Company, Passaic, N. J., a corporation of New Jersey No Drawing. Application April 2, 1943,
Serial No. 481,567

8 Claims. (Cl. 260—209)

This invention relates to the purification of Irish moss, especially purification methods which involve preparation of a gum solution from the crude material and subsequent extraction of a highly refined gum by an alcohol precipitation treatment. More particularly, the invention relates to improvement in procedures of the character described and claimed in United States Patent No. 2,231,283 of Arnold Pfister, granted February 11, 1941 for Manufacture of Irish moss, and to procedures of the character described and claimed in my United States Patent No. 2,231,284, granted February 11, 1941 for Purification of Irish moss.

Accordingly, a chief object of the invention is to provide improved and highly economical methods for the treatment of Irish moss (which is understood to be a particular type of marine vegetation, including *Chondrus crispus* and like closely related or otherwise fully equivalent species, such as are commonly sold or known as Irish moss) in the manufacture of a refined and purified gum or colloidal product therefrom. An important specific object is to provide new and more economical operations or pre-treatments for the several procedures described and claimed in the aforesaid Patents Nos. 2,231,283 and 2,231,284, and a still further object is to afford improved, expedited and less expensive methods for the manufacture of the refined and purified products which are described in both the aforesaid patents and which are claimed in the Pfister Patent No. 2,231,283. Other objects include such as are hereinafter stated or apparent and such as are incidental to the practice of the improved procedure of the invention.

Although reference may be had to the aforesaid Pfister patent for a more complete description of the procedure there disclosed, certain preferred features of that procedure include preparing a filtered, aqueous solution of Irish moss gum, and precipitating the gum from the solution as a segregative precipitate, by passing successive small increments of the gum solution into a relatively large body of alcohol while effecting thorough physical division of the dissolved and precipitating gum relative to the alcohol, for instance by spraying the gum solution into a tank of alcohol, from above or below the surface, and vigorously agitating the liquid in the tank. The resulting precipitate is such as to be readily washed and dried, without extensive heat or other treatment that would impair the viscosity of the product or its other desirable properties.

Reference may similarly be had to my aforesaid Patent No. 2,231,284 for complete disclosure of its procedures; one example of such procedures including the steps of mixing the extracted and filtered gum solution with alcohol, in the interior of a mixing nozzle, and thereafter carrying or projecting the mixture immediately to an atttrition mill or like grinding apparatus, which not only grinds up and thus divides the precipitate, but preferably comminutes it as fast as it is formed, and according to my stated belief, while the precipitating action is actually going on. Another example of my patented procedure includes mixing alcohol into a violently agitated body of the extracted and filtered gum solution until the resulting mixture has a true alcohol content of about 50%. The resulting precipitate-forming mixture is thereafter forced through a relatively small orifice, where it is intimately mixed with further alcohol, the latter being understood to bring about a completion of the precipitating action and an effective comminution of the precipitate by the strong shearing force of the alcohol on the rapidly moving gum solution at the nozzle or orifice. In each of these examples, the precipitated particles of purified gum are found to be readily separated from the liquid, and are easily dried with not more than mild heat, to provide a refined, purified, high-viscosity colloid, in comminuted form and of the character embraced by the cited Pfister patent.

The present invention is based upon my discovery that alcohol precipitation procedures for manufacturing a purified and refined Irish moss, as in the manner just explained, may be improved, expedited and made considerably more economical, particularly in regard to the amount of alcohol needed for best results, by including in the crude gum solution a small percentage of salt, viz. sodium chloride. Thus for instance, where the prior procedure was carried out by the utilization of 55 parts by volume of isopropyl alcohol for each 36 parts of aqueous gum solution (comprising, say, a 1% to 10% solution of the so-called soluble part of the crude moss, the strength of the solution being preferably as high as possible without such viscosity as would interfere with mechanical handling), employment of my new method affords the attainment of the same desirable results and the same high quality, purified precipitate, but with the use of not more than about 38 parts by volume of isopropyl alcohol for each 53 parts of gum solution, thus reducing the consumption of alcohol, a relatively costly commodity, from about 1.53 parts for each part of gum solution to only about 0.72 part for each part of gum solution.

An example of presently preferred procedure according to my invention, is to digest the crude Irish moss with water in the usual manner, and filter out the insoluble or crude fiber fraction. This may be done with extraction kettles of the customary type, yielding a water solution or hydration of the gum with considerable fibrous or other insoluble material in suspension, which is then passed to a filter press, where the fiber sludge is removed. To the filtrate, which comprises the gum solution to be purified, there may now be added, for example, from about 0.8% to about 5.0% or slightly more (by weight) of sodium chloride. The salt thus added is permitted to dissolve, with agitation, in the gum solution; complete solution usually requiring about 5 to 30 minutes, depending upon the volume of gum solution involved. If desired, the gum solution can then be concentrated under vacuum to increase the gum solids content, or it may be subjected to the purification treatment without such concentration. In many instances, the concentration treatment is of definite advantage, in that it increases the solids content and thus affords a further saving in the alcohol treatment, i. e. in effect an economy of alcohol for the quantity of solid gum involved. Moreover, it is undesirable to take the hot solution directly from the filter press to the alcohol treatment, because the heat causes undue evaporation and waste of alcohol, and since a cooling time is thus preferred anyway, the concentration treatment does not unduly prolong the complete manufacturing process.

There is thus established a desired hydration or solution of the crude Irish moss, substantially free from water-insoluble material, and containing a minor quantity of dissolved sodium chloride. The liquid is then subjected to alcohol precipitation treatment, such as one or another of the treatments described hereinabove, or more fully described in the cited Patents Nos. 2,231,283 and 2,231,284. As has now been explained, such precipitation treatment may be carried out with eminently satisfactory results by employing substantially less alcohol than would have been considered necessary for optimum results in the absence of my new pre-treatment. Thus in the Pfister process, for instance, instead of using 50 or more parts by volume of 91% isopropyl alcohol for each 36 parts of the gum solution (concentrated or unconcentrated), only about 25 parts of the alcohol will suffice; and like economy may be had where other alcohol is used instead of isopropyl. For example, eminently satisfactory results, following my new pre-treatment, may be had with the use of only about 38 parts by volume of ethyl alcohol for each 57 parts of concentrated or unconcentrated gum solution sprayed into the alcohol. The same economies, and optimum results with the same reduced quantities of alcohol, may be achieved with the procedures of my Patent No. 2,231,284; preferred results being attained in each case where the total quantities of alcohol and gum solution used, are in the economical proportions set forth hereinabove, for example, by volume, 38 parts of isopropyl alcohol for each 53 parts of concentrated or unconcentrated gum solution, or 38 parts of ethyl alcohol for each 57 parts of concentrated or unconcentrated gum solution.

Although the exact reasons for the phenomenon are not clearly understood, particularly with reference to the savings which are afforded by the presence of dissolved sodium chloride and which are otherwise unattainable in practical manufacturing operation, it is believed that the effects are entirely physical and that there is no chemical reaction, at least of any permanent sort. Thus upon addition of the sodium chloride to the gum solution, the latter exhibits a definitely observable, jelled condition; and to a certain extent, within the ranges of the sort here specified, the greater the salt concentration, the more viscous, or the firmer, is the resulting jell. Moreover, investigation has indicated that the phenomenon or reaction is reversible, in that upon removal of the salt, the stiffly viscous or jell-like solution returns to its original consistency. This effect may be demonstrated upon removing the sodium chloride by dialysis (e. g. through a porous wall or membrane, into successive quantities of plain water), whereby the gum solution is found to be restored to its previous character and consistency.

Furthermore, when the alcohol-precipitation procedures are carried out on a gum solution pretreated with sodium chloride as described above, the salt remains in the alcohol-water vehicle upon removal of the precipitated colloid. The final washed and dried precipitate—being the same refined and purified Irish moss gum as described in the cited patents—is free of the salt and is capable of normal re-hydration, i. e. of forming a solution which is in every respect comparable to a similar solution comprised of the rehydrated precipitate previously made by any of the aforesaid patented methods.

Experience has indicated that the preferred amount of sodium chloride to be incorporated may vary somewhat with the original quality of the crude Irish moss extracted, and by quality is meant chiefly the viscosity of the solution or "mucilage" extractable from the crude gum. Thus referring to solutions made with a concentration of about 1.5% of the original crude material (including insoluble fiber) and thereafter filtered, I would consider a mucilage having a viscosity of about 35.0 to 45.0 centipoises as representing a crude gum of low quality; and intermediate and higher qualities would thus be crude gums providing, in similar solution, viscosities of progressively higher values, even sometimes up to several hundred centipoises or more.

Generally speaking, the lower the quality of the crude Irish moss, the greater the salt concentration required in the gum solution in order to attain optimum precipitation and purification of the colloid with the extremely low proportions of alcohol mentioned hereinabove. It will be appreciated, of course, that if full advantage of the alcohol economy is not to be taken, somewhat lower concentrations of salt may be employed. On the other hand I have not found it necessary, even for maximum saving in the amount of precipitant alcohol, to employ a sodium chloride concentration in substantial excess of about 5.0% for even the lowest of many qualities of Irish moss tested; while with high qualities of Irish moss, I have found that to attain the specific results described hereinabove, the sodium chloride concentration should be at least about 0.8%.

Although the viscosity of the extracted and filtered crude moss solution is usually a fair indication of the amount of sodium chloride to be added for optimum results, experience indicates that the correlation between quality as measured by viscosity, and the amount of salt required, is not an absolute criterion. Unexplained deviations occur in some cases, but it will be readily understood that the amount of salt required for best results with a particular quality of Irish moss being processed, may be very easily determined by test, for instance as by regular plant procedure; and therefore, for the greatest accuracy and best economy of all ingredients, I prefer to determine the desired amount of sodium chloride by such test. In general, the actual amount of salt to be added may depend on whether and to what extent the gum solution is to be concentrated (as by evaporation under vacuum), or whether it is to remain unconcentrated prior to the precipitation treatment. For example, if an extracted and filtered gum solution is such that it would require 0.8% of sodium chloride for optimum alcohol economy when subjected to the precipitation process without intermediate treatment, only 0.4% of sodium chloride will actually be required if the gum solution is to be concentrated under vacuum so as, in effect, to double its total solids content, including the salt.

According to experimental investigation in the laboratory, other salts than sodium chloride may be employed to obtain similar or comparable effects under a commonly experienced set of conditions, which the tests were believed to represent. Thus the following compounds, which are substantially neutral or non-acidic salts readily soluble in water and alcohol-water mixtures, have given indication of satisfactory results: ammonium sulfate, ammonium nitrate, potassium chloride, potassium carbonate and potassium sulfate. These were each tested, successfully, in quantities of the same order as of sodium chloride employed according to the preferred practice hereinabove set forth; it is to be noted, however, that none of these compounds exhibited any advantage over sodium chloride, nor is any of them as economical as sodium chloride in the process.

As stated, the alcohol precipitation treatment may conveniently be of exactly the sort set forth in the cited patents, my present preference being for the expeditious and rapid type of procedure illustrated in Fig. 2 of my patent No. 2,231,284. The actual precipitation of the gum, in divided and highly purified form, away from its soluble impurities, is effected as therein disclosed, and likewise the separation of the gum precipitate from the liquid, and its washing and final drying treatments. The sodium chloride is effectively removed along with the alcohol-water vehicle and the soluble impurities, after having exhibited its remarkable property of permitting a great reduction in the amount of precipitant alcohol required—e. g. such that the final precipitating mixture is only about 38% alcohol instead of 55% according to the previously preferred practice. Sodium chloride, it may be noted, is a highly soluble neutral compound, which appears to have no chemical or other effect on any of the desired properties of the final, precipitated colloid; moreover, it is a very inexpensive material, readily available in a desired state of purity, and its special efficacy for the desired results has been clearly demonstrated by extensive test operations.

In many cases, I have found that the addition of more sodium chloride than the minimum required for greatest alcohol economy, has no deleterious effect, but rather increases the efficiency of subsequent separation of precipitate from the alcohol-water vehicle. Consequently, in actual practice I prefer to employ a slight excess of the salt, since in so doing the over-all economy of the procedure is not appreciably affected. On the other hand, large excesses of sodium chloride are usually to be avoided; although the salt does not appear to be a precipitant itself (i. e., useful or satisfactory precipitation of a purified colloid cannot be achieved simply by adding salt, no matter how large the quantity), the jelling or thickening effect of too much sodium chloride tends to impede the steps of forcing the gum solution through spray devices, nozzles or other small orifices, as preferred for alcohol precipitation. Various strengths of crude gum solution may be used, the concentration being conveniently determined or adjusted for best results with the alcohol precipitation treatment. For example, an advantageous procedure is to make up an aqueous solution, which prior to filtration, embodies approximately 1.5% of the crude, fiber-containing Irish moss; after filtration, the solution may be concentrated in vacuum to a gum solids content of about 3.0%, the salt being added in the desired proportion to the final quantity of liquid, either before or after concentration.

The original crude gum solution is preferably filtered before concentration and before addition of the salt, since each of those operations tends to stiffen the solution, so to speak, and thus make it more difficult to force through the filter press.

It is to be understood that the invention is not limited to the specific examples herein disclosed for purposes of illustration, but may be carried out in other ways and with the use of equivalents, without departure from its spirit.

I claim:

1. In procedure for refining Irish moss gum wherein a purified product is precipitated from gum solution by treatment with alcohol, the steps of extracting an aqueous gum solution from crude Irish moss, separating the solution from insoluble matter therein, and dissolving not less than 0.8% nor more than about 5% of sodium chloride in the separated aqueous gum solution, prior to said alcohol precipitation treatment.

2. In the purification of Irish moss gum by precipitation of the gum from an aqueous solution thereof, with alcohol, the procedure which comprises exerting precipitating action of alcohol on the dissolved gum in the presence of added sodium chloride dissolved in the solution in amount equal to not less than about 0.8% nor more than about 5% of the gum solution.

3. In procedure for refining Irish moss gum wherein a purified product is precipitated from aqueous gum solution by treatment with alcohol, the step of reducing the alcohol-precipitant requirement of the aqueous gum solution by incorporating in the latter a quantity of sodium chloride in amount not less than about 0.8% nor more than about 5% and adapted to produce a jelled condition of said solution.

4. In the purification of Irish moss gum by alcohol precipitation treatment of an aqueous gum solution, the procedure which comprises reducing the alcohol-precipitant requirement of the treatment, by performing said treatment upon the dissolved gum in the presence of sufficient dissolved sodium chloride in amount not less than about 0.8% nor more than about 5% to increase the viscosity of the solution.

5. In procedure for refining Irish moss gum wherein a purified product is precipitated from an aqueous gum solution by treatment with alcohol, the step of establishing, in the aqueous gum solution which is treated with alcohol, a dissolved sodium chloride content of about 0.8% to about 5.0%, adapted to stiffen the solution and reduce its alcohol-precipitant requirement.

6. In the purification of Irish moss gum by alcohol precipitation treatment which includes forcing a gum-containing aqueous solution through means reducing the liquid to a body of small cross-section, the step of enhancing the alcohol-precipitating action by including with the dissolved gum a quantity of sodium chloride in amount not less than about 0.8% nor more than about 5% and sufficient to substantially stiffen the gum solution without impeding the passage of said solution through the aforesaid means.

7. In procedure for refining Irish moss gum wherein a purified product is precipitated from crude gum solution by treatment with alcohol, the steps of establishing an aqueous gum solution containing from about 0.8% to about 5% of sodium chloride, and subjecting said solution to alcohol precipitation treatment.

8. A method of producing purified Irish moss gums from extracted and filtered aqueous gum solutions which includes dissolving in each such solution a quantity of water-soluble alkali metal salt in amount not less than about 0.8% nor more than about 5% and sufficient only to effect a substantial stiffening of the solution, and then subjecting the stiffened solutions to alcohol precipitation treatments.

NORMAN BLIHOVDE.